United States Patent
Frewen et al.

(10) Patent No.: US 12,223,847 B2
(45) Date of Patent: Feb. 11, 2025

(54) SPATIO-TEMPORAL TRACK DENSITY SHAPING

(71) Applicant: Raytheon Company, Arlington, VA (US)

(72) Inventors: Thomas Frewen, West Hartford, CT (US); Hala Mostafa, Marlborough, CT (US); Michael D. Dubois, Franklin, MA (US); Stephen K. Freitag, Marlborough, MA (US)

(73) Assignee: Raytheon Company, Arlington, VA (US)

( * ) Notice: Subject to any disclaimer, the term of this patent is extended or adjusted under 35 U.S.C. 154(b) by 339 days.

(21) Appl. No.: 17/677,663

(22) Filed: Feb. 22, 2022

(65) Prior Publication Data
US 2023/0267844 A1 Aug. 24, 2023

(51) Int. Cl.
G08G 5/00 (2006.01)
G06F 18/214 (2023.01)
G06N 20/00 (2019.01)

(52) U.S. Cl.
CPC ....... *G08G 5/0043* (2013.01); *G06F 18/2148* (2023.01); *G06N 20/00* (2019.01); *G08G 5/0013* (2013.01)

(58) Field of Classification Search
CPC .. G08G 5/0043; G08G 5/0013; G08G 5/0026; G08G 5/0082; G06F 18/2148; G06N 20/00
See application file for complete search history.

(56) References Cited

U.S. PATENT DOCUMENTS

2023/0162102 A1* 5/2023 Galon ............. G06Q 10/06315
705/7.25

OTHER PUBLICATIONS

Conde Rocha Murca, Mayara, et al. "Trajectory clustering and classification for characterization of air traffic flows." 16th AIAA Aviation Technology, Integration, and Operations Conference. 2016. (Year: 2016).*
Conde Rocha Murca, Mayara, et al. "Trajectory clustering and classification for characterization of air traffic flows." 16th AIAA Aviation Technology, Integration, and Operations Conference. (Year: 2016) (Year: 2016).*

(Continued)

*Primary Examiner* — Russell Frejd
*Assistant Examiner* — Ana D Thomas
(74) *Attorney, Agent, or Firm* — Schwegman Lundberg & Woessner, P.A.

(57) ABSTRACT

A system includes a first dataset of vehicle trajectories including individual vehicle tracks forming a first track density, a desired vehicle track density profile, a spatio-temporal coverage metric, and a track model including Heaviside functions encoding track time origins and durations for the individual vehicle tracks and including locations for the plurality of individual vehicle tracks. Approximations of the Heaviside functions are minimized as a function of the spatio-temporal coverage metric. The first dataset of vehicle trajectories is manipulated to satisfy the desired vehicle track density profile through minimizing an approximation of the Heaviside functions. Each individual vehicle track in the first dataset of vehicle trajectories is shifted as a result of the optimization, thereby generating a second dataset of vehicle trajectories having a second track density.

17 Claims, 8 Drawing Sheets

(56) References Cited

OTHER PUBLICATIONS

Kochenderfer, M.J., et al., "Uncorrelated Encounter Model of the National Airspace System", Massachusetts Institute of Technology, Lincoln Laboratory, Project Report ATC-345, (Nov. 14, 2008), 114 pgs.

Mathew, George, et al., "Metrics for ergodicity and design of ergodic dynamics for multi-agent systems", Physica D (2010), doi:10.1016/j.physd.2010.10.010, 11 pgs.

* cited by examiner

SPATIO-TEMPORAL TRACK DENSITY SHAPING

TECHNICAL FIELD

The present disclosure relates to spatio-temporal shaping of vehicle track trajectories, and in an embodiment, but not by way of limitation, the spatio-temporal shaping of aircraft track trajectories.

BACKGROUND

Datasets of aircraft track trajectories are becoming crucial enablers of simulators and are needed to train humans and artificial intelligence (AI) on tasks like air traffic control and radar resource management. The proper and effective management of airspace resources depends on having large volumes of realistic training data that offer varying challenge levels to artificial intelligence algorithms. However, collecting track data is a time-consuming process. The spatio-temporal density of the collected data depends on uncontrollable factors such as weather, the time of day, and the traffic in each area.

DETAILED DESCRIPTION

Figure 1:
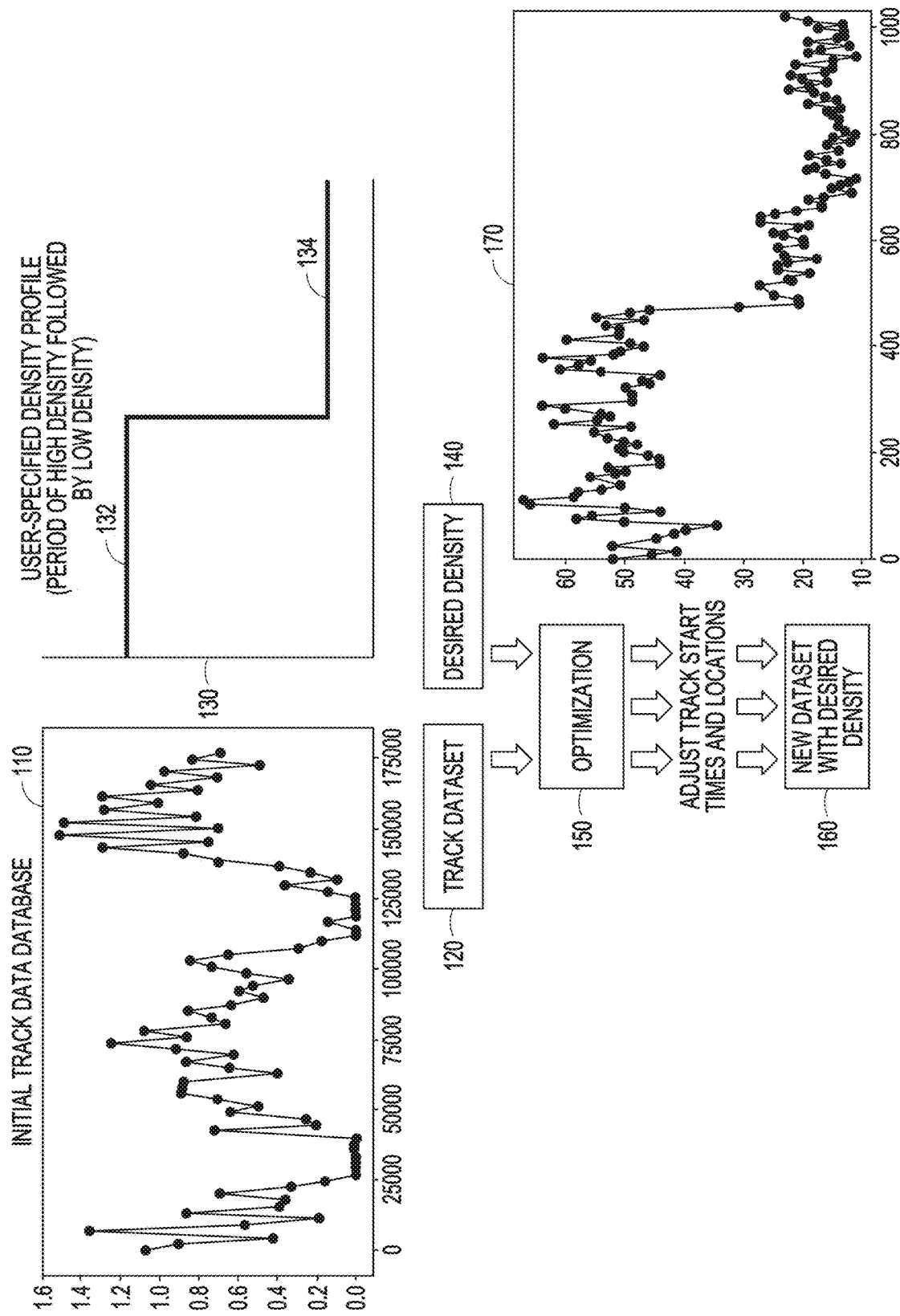
FIG. 1 is a diagram of a process that generates track datasets that meet desired density profiles.

In the following description, for purposes of explanation, numerous specific details are set forth in order to provide a thorough understanding of the various aspects of different embodiments of the present invention. It will be evident, however, to one skilled in the art, that the present invention may be practiced without all the specific details and/or with variations, permutations, and combinations of the various features and elements described herein.

As noted above, collecting aircraft track trajectory data is a time-consuming process. In response to this, one or more embodiments address track data scarcity by generating modified track datasets from an initial synthetic or real track dataset. The generated dataset is then optimized to meet user-specified density requirements.

An embodiment generates 'shifted' track datasets on demand from a core set of synthetic or real track data. Given a desired profile of track density over time, the embodiment intelligently adapts, shapes, and augments existing track data to generate a dataset with the desired density profile. Additional applications of the embodiment include its utility in generating realistic airspace traffic patterns and densities in support of decision making.

The shifting or reshaping of an initial track dataset in time and/or space to generate more challenging datasets is different from previous systems in several ways. For example, the treatment of the problem of how to reshape input datasets as an optimization problem is different and unique. Also, the use of a spatio-temporal coverage metric in the context of track datasets is a novel aspect of the embodiments disclosed herein. Representing track trajectory over time using Heaviside functions is another novel aspect. The smooth approximation of Heaviside functions to formulate the track shaping problem as a continuous mathematical program is another novel aspect.

Additionally, previous systems do not allow a user to modify track datasets according to a desired density profile. Unlike the disclosed embodiments, prior systems manipulate an entire dataset by translating a radar's location and face orientation. The embodiments disclosed herein manipulate individual tracks by translating each one in time and space. Previous systems create dense datasets by combining multiple flight tracks. The embodiments disclosed herein provide a more granular and time-varying control of density. The goal of prior systems is not to manipulate spatio-temporal density like in current embodiments, but rather, at least in some prior systems, to study near mid-air collisions. Also, previous systems increase density only by injecting new tracks, rather than manipulating existing tracks in space and time. As noted, a goal of some prior systems is not to manipulate spatio-temporal density, but rather to understand how well a set of tracks "cover" a given space in order to design cooperative controllers to produce tracks with better coverage. In other words, prior systems produce controllers that induce the same set of trajectories (that uniformly covers the space) every time.

Figure 2:
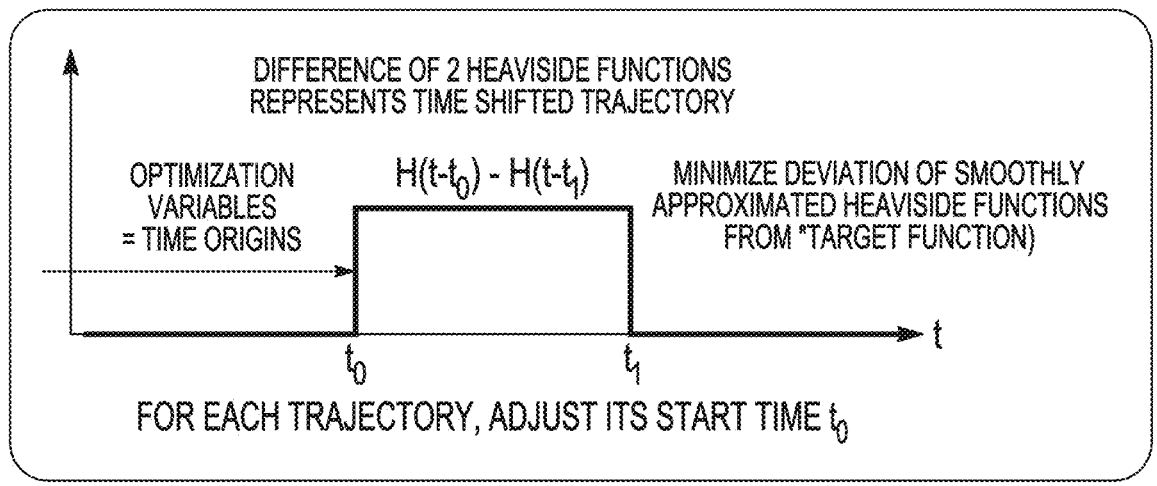
FIG. 2 illustrates an example of the difference between two Heaviside functions.

With these differences from prior systems in mind, and now referring to FIG. 1, an embodiment generates track datasets 160 that meet desired density profiles. This generation of the track datasets 160 that meet desired density profiles uses as input an initial dataset 110, 120 and a desired spatial and/or temporal track density 130, 140 over time. For example, in FIG. 1, the user-specified density profile consists of a period of high density 132 followed by a period of low density 134. In general, the initial dataset is shaped using mathematical optimization 150 to determine the optimal temporal and spatial shift that should be applied to each track to achieve the desired track density. The optimization parameters are the start time and coordinates of each track in the new dataset. The deviation (over time) from the desired value of a spatio-temporal coverage metric that captures density is minimized. The optimal value of start time and location for each track is generated such that, collectively, the resulting track dataset 160 meets the desired spatio-temporal density profile. The resulting track dataset 160 is illustrated in graphic form at 170. As illustrated in FIG. 2, the difference of two Heaviside functions represents the time shifted trajectory, and the deviation of smoothly approximated Heaviside functions from a target function is minimized. The target function is discussed in more detail below.

Figure 3:
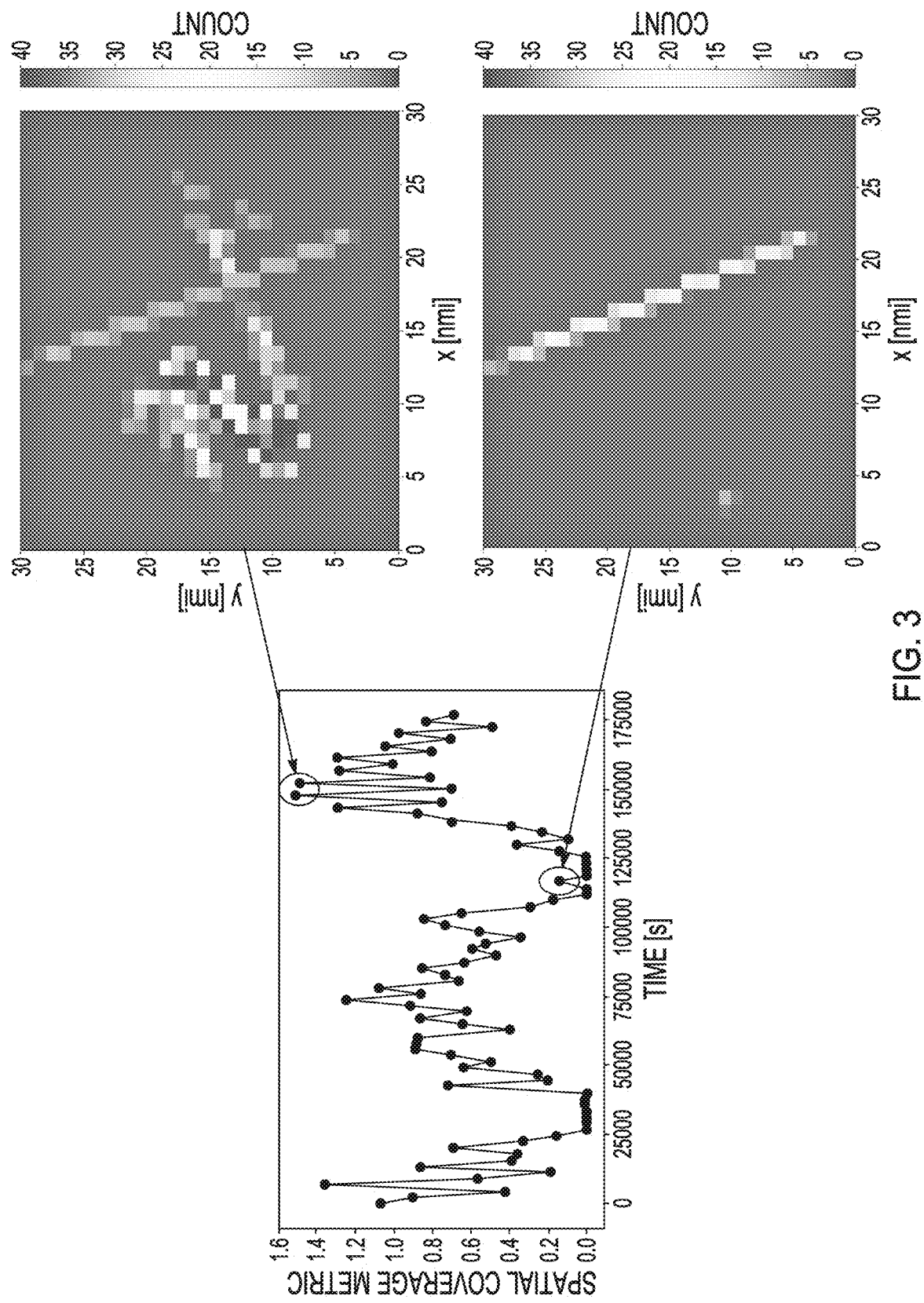
FIG. 3 illustrates an example of an evolution of a spatio-temporal coverage metric.
Figure 4:
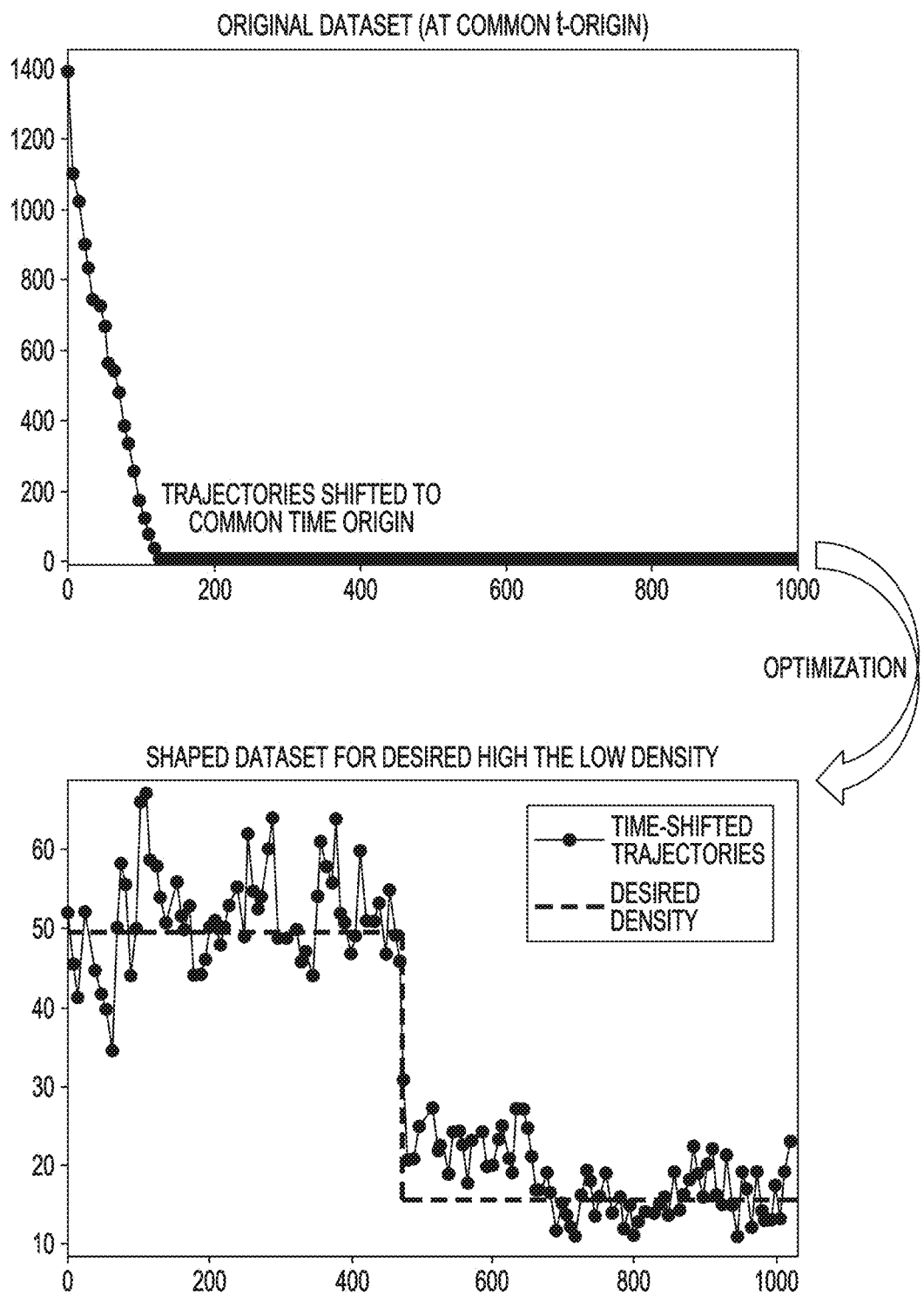
FIG. 4 illustrates an original dataset and the shaping of that original dataset.

The system uses a spatio-temporal coverage metric. The metric captures the level of spatio-temporal density of a set of tracks. FIG. 3 illustrates how the coverage metric captures spatio-temporal density using two example snapshots of binned trajectories and their coverage metric values of 1.5 and 0.3. Optimizing with respect to this metric allows the control of the track density. The left panel of FIG. 3 illustrates the evolution in time of the spatio-temporal coverage metric. The right panel of FIG. 3 shows two snapshots (from the highlighted/circled locations on the left panel of FIG. 3) of binned trajectories (i.e., counts per bin in a time window) in the x-y plane. The top panel of FIG. 4 shows trajectories from the initial track dataset shifted to a common time origin. The bottom panel of FIG. 4 shows the time-shifted (by the optimization algorithm) trajectories. The x-axis is time in seconds, and the y-axis is trajectory counts in a time windowed bin.

Figure 5:
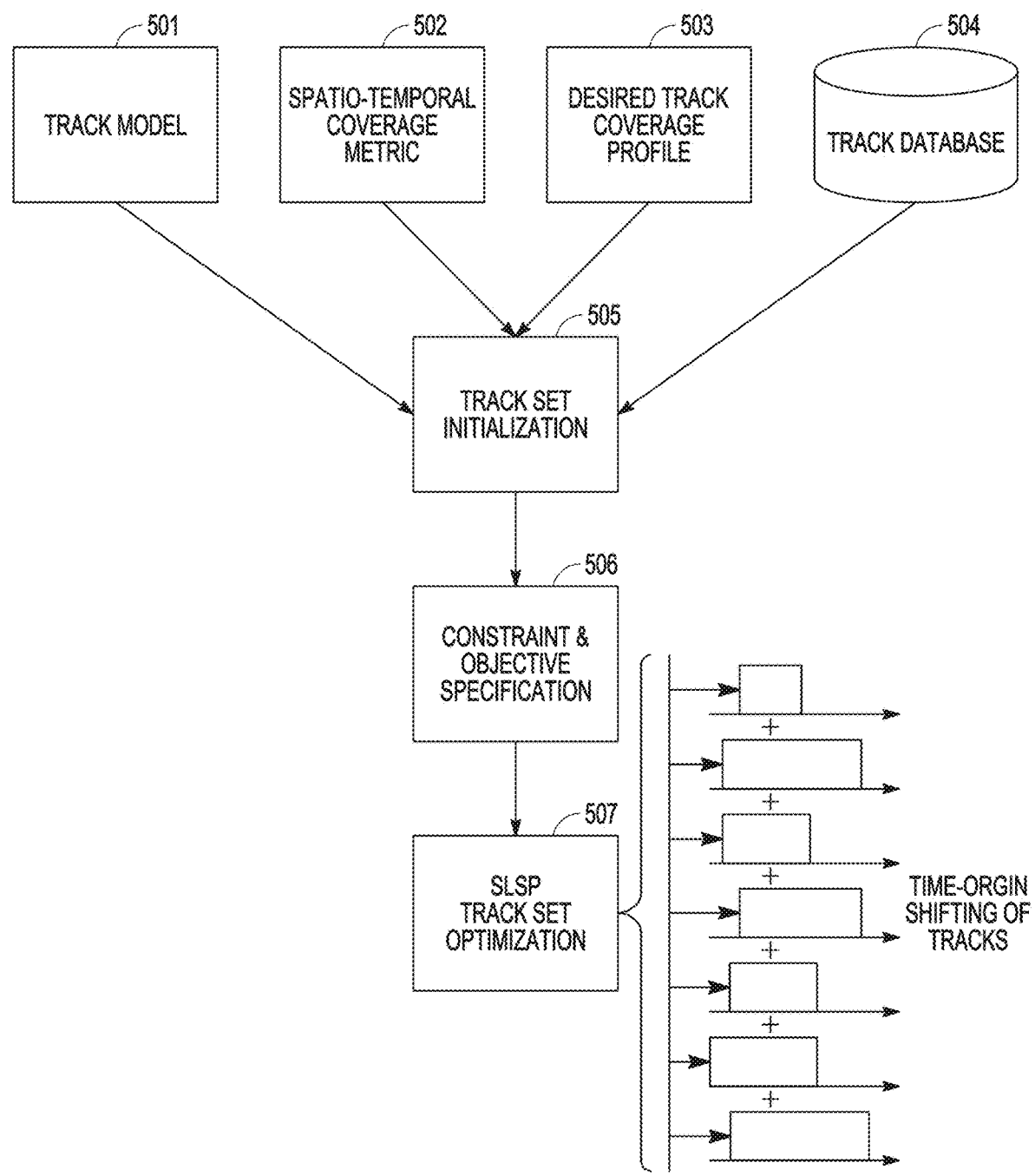
FIG. 5 is another diagram of a process that generates track datasets that meet desired density profiles.

FIG. 5 is another diagram of a process that generates track datasets that meet desired density profiles. In FIG. 5, at 501, a track model consists of a composition of Heaviside functions that encode track time origin, track time duration, and associated spatial information. At 502, a metric is provided that captures the spatio-temporal density of a collection of tracks. An example of such a metric was discussed in connection with FIG. 3. Block 503 represents the desired track coverage profile, and block 504 represents the track database. As indicated at 505, an embodiment uses a batch strategy for initializing a track set and for performing sequential optimization over batches of track data. For example, one strategy may be to first perform optimization using a collection of longer duration trajectories and subsequently "refine" the result by further optimizing with a collection of short duration trajectories. At 506, an objective function that measures the deviation of the observed spatio-temporal coverage and the desired user-specified value for the current batch formed at 505 is minimized. At 507, a sequential least squares programming optimization approach is used to solve the minimization problem. The solution results in temporally (or spatially) shifted tracks that satisfy a target value of the spatio-temporal coverage metric.

An example of the objective function 506 (or as noted above the target function), which in an embodiment is a minimization of the tan h approximation of the Heaviside function, is as follows:

$$Obj = \Sigma_{i=1}^{n} [\Sigma_k \tilde{H}^k(t_i, t_k^{origin}; d_k) - f^{targ}(t_i)]^2$$

Time grid point i
Trajectory k    Duration of trajectory k $$\tilde{H}^k(t, t_k^{origin}; d_k) := \tanh(t - t_k^{origin}) - \tanh(t - t_k^{origin} - d_k)$$

The outer summation over index i runs over points in the time discretization. The inner summation k runs over trajectories in the dataset. The duration of the $k^{th}$ trajectory (defined/fixed by the data) is $d_k$. The adjustable (by the optimization algorithm) time origin of the $k^{th}$ trajectory is $t_k^{origin}$. The inner sum of the equation measures the deviation between the collection of the trajectories and the target profile at the time discretization point $t_i$.

Figure 6A:
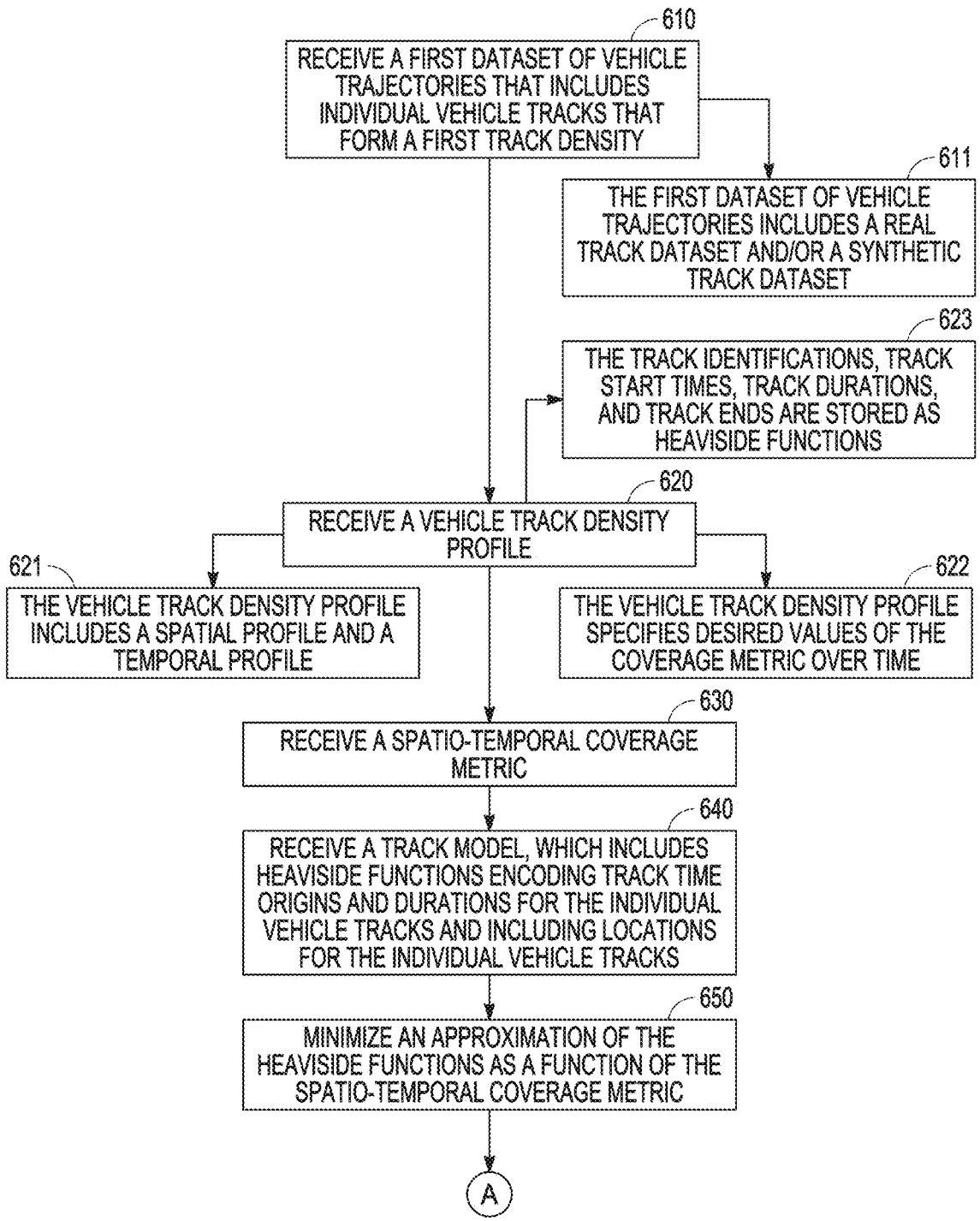
FIGS. 6A and 6B are another diagram of a process that generates track datasets that meet desired density profiles.
Figure 6B:
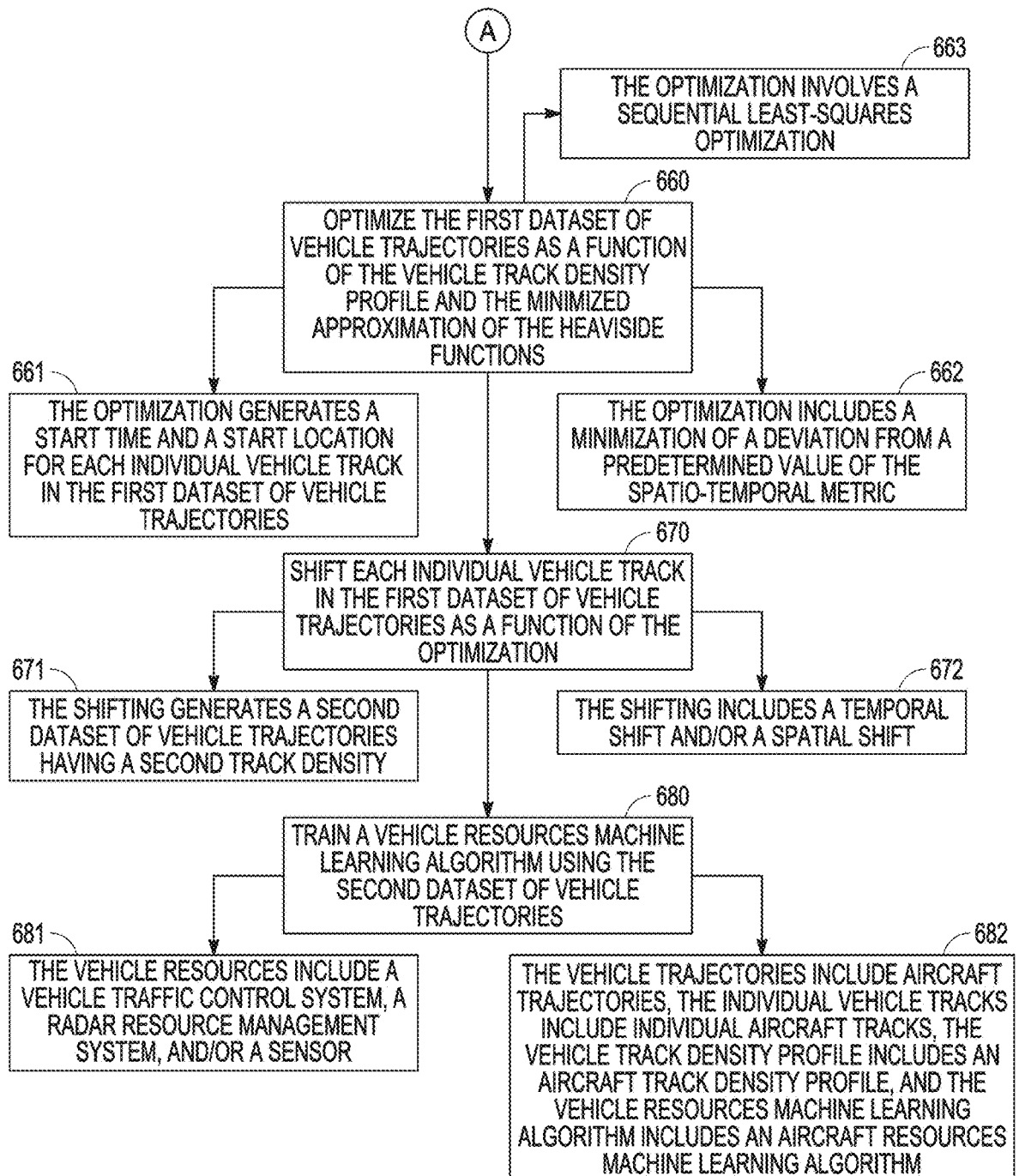

FIGS. 6A and 6B are a block diagram illustrating features and operations to shape a spatio-temporal track density. FIGS. 6A and 6B include a number of feature and process blocks 610-682. Though arranged substantially serially in the example of FIGS. 6A and 6B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 6A and 6B, a process for shaping a spatio-temporal track density includes, at 610, a first dataset of vehicle trajectories, which includes individual vehicle tracks that form a first track density, is received and/or stored into a computer processor and/or a computer storage device. As indicated as 611, the first dataset of vehicle trajectories can include one or more of a real track dataset and a synthetic track dataset.

At 620, a vehicle track density profile is received and/or stored into the computer processor and/or the computer storage device. The vehicle track density profile can include a spatial profile and/or a temporal profile (621). The vehicle track density profile specifies desired values of the coverage metric over time (622). These track identifications, track start times, track durations, and track ends can be stored as Heaviside functions (623).

At 630, a spatio-temporal coverage metric is received and/or stored into the computer processor and/or the computer storage device. At 640, a track model, which includes Heaviside functions, is received and/or stored into the computer processor and/or the computer storage device. The Heaviside functions encode track time origins and durations for the individual vehicle tracks and include locations for the individual vehicle tracks. At 650, an approximation of the Heaviside functions is minimized as a function of the spatio-temporal coverage metric.

At 660, the first dataset of vehicle trajectories is optimized as a function of the vehicle track density profile and the minimized approximation of the Heaviside functions. As indicated as 661, the optimization generates a start time and a start location for each individual vehicle track in the first dataset of vehicle trajectories. As also indicated at 662, the optimization works by minimization of the deviation from a predetermined value of the spatio-temporal metric. As further indicated as 663, the optimization involves a sequential least-squares optimization. The optimization can also generate other results, such as a minimum spacing between aircraft.

At 670, each individual vehicle track in the first dataset of vehicle trajectories is shifted as a result of the optimizing. This shifting generates a second dataset of vehicle trajectories having the desired track density (671). The shifting can include a temporal shift and/or a spatial shift (672).

At 680, a vehicle resources machine learning algorithm is trained using the second dataset of vehicle trajectories. As indicated at 681, the vehicle resources can include a vehicle traffic control system, a radar resource management system, and/or a sensor. As indicated at 682, the vehicle trajectories can include aircraft trajectories, the individual vehicle tracks can include individual aircraft tracks, the vehicle track density profile can include an aircraft track density profile, and the vehicle resources machine learning algorithm can include an aircraft resources machine learning algorithm.

Figure 7:
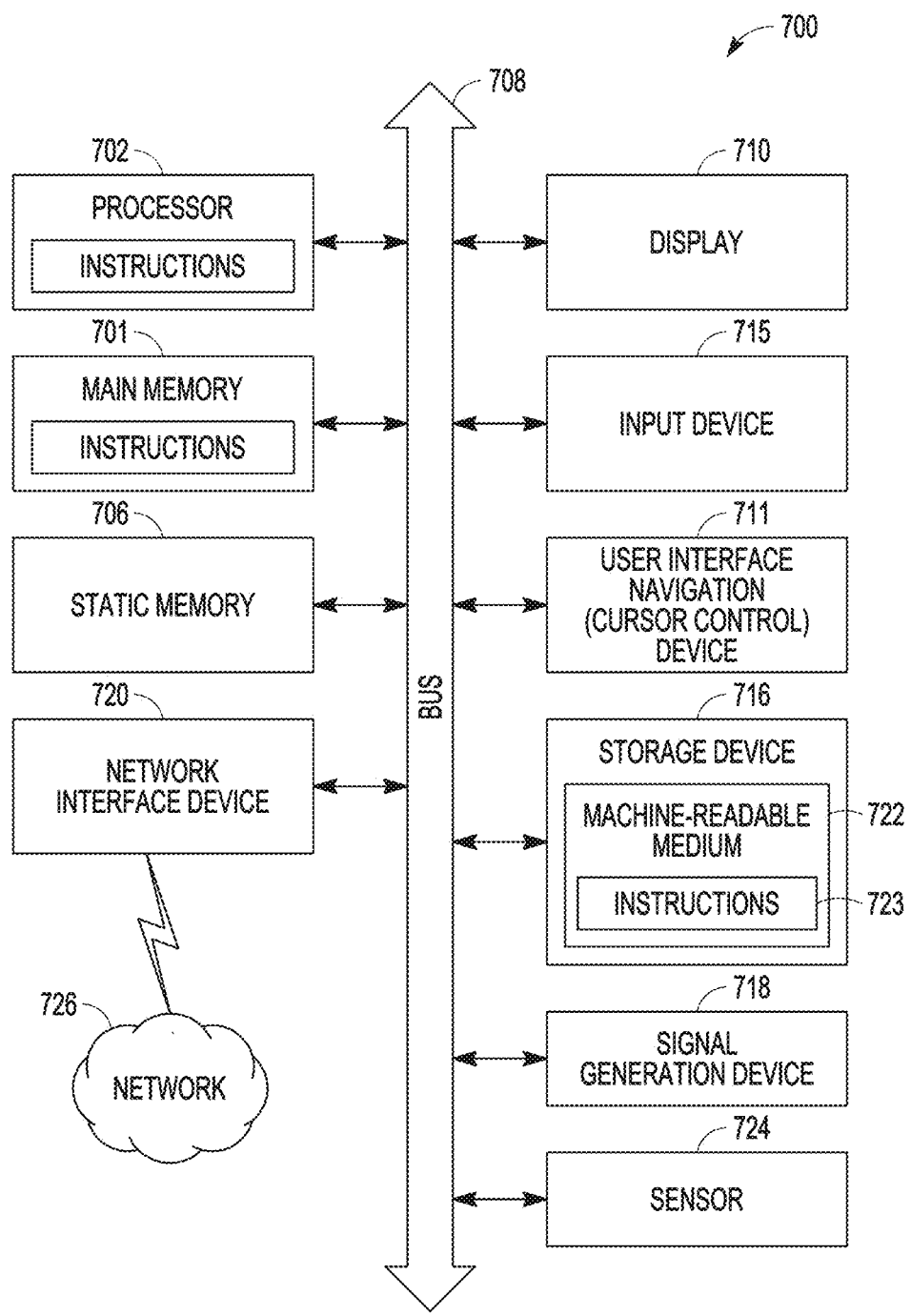
FIG. 7 is a block diagram of a computer architecture upon which one or more of the disclosed embodiments can execute.

FIG. 7 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 701 and a static memory 706, which communicate with each other via a bus 708. The computer system 700 may further include a display unit 710, an alphanumeric input device 717 (e.g., a keyboard), and a user interface (UI) navigation device 711 (e.g., a mouse). In one embodiment, the display, input device and cursor control device are a touch screen display. The computer system 700 may additionally include a storage device 716 (e.g., drive unit), a signal generation device 718 (e.g., a speaker), a network interface device 720, and one or more sensors 724, such as a global positioning system sensor, compass, accelerometer, or other sensor.

The drive unit 716 includes a machine-readable medium 722 on which is stored one or more sets of instructions and data structures (e.g., software 723) embodying or utilized by any one or more of the methodologies or functions described herein. The software 723 may also reside, completely or at least partially, within the main memory 701 and/or within the processor 702 during execution thereof by the computer system 700, the main memory 701 and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 723 may further be transmitted or received over a communications network 726 using a transmission medium via the network interface device 720 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
    receiving into a computer processor a first dataset of vehicle trajectories comprising a plurality of individual vehicle tracks forming a first track density;
    receiving into the computer processor a vehicle track density profile;
    receiving into the computer processor a target spatio-temporal coverage metric that is an indication of a user-specified vehicle track density profile;
    receiving into the computer processor a track model comprising a plurality of Heaviside functions encoding track time origins and durations for the plurality of individual vehicle tracks and comprising locations for the plurality of individual vehicle tracks;
    minimizing an approximation of the Heaviside functions as a function of the target spatio-temporal coverage metric;
    optimizing the first dataset of vehicle trajectories as a function of the vehicle track density profile and the minimized approximation of the Heaviside functions;
    reshaping each individual vehicle track start time and start location in the first dataset of vehicle trajectories as a function of the optimizing, thereby generating a second dataset of vehicle trajectories having a second track density; and
    training a vehicle resources machine learning algorithm using the second dataset of vehicle trajectories.

2. The process of claim 1, wherein the optimizing comprises a minimization of a deviation from a predetermined value of the target spatio-temporal metric.

3. The process of claim 1, wherein the optimizing comprises a sequential least-squares optimizing.

4. The process of claim 1, wherein the first dataset of vehicle trajectories comprises one or more of a real track dataset and a synthetic track dataset.

5. The process of claim 1, wherein the vehicle track density profile comprises one or more of a spatial profile and temporal profile.

6. The process of claim 1, wherein the vehicle track density profile comprises track identifications, track start times, track durations, and track coordinates.

7. The process of claim 1, wherein the vehicle track density profile comprises a plurality of Heaviside functions comprising track start times, track durations, and track coordinates.

8. The process of claim 1, wherein the vehicle resources comprise one or more of a vehicle traffic control system, a radar resource management system, and a sensor.

9. The process of claim 1, wherein the vehicle trajectories comprise aircraft trajectories, the individual vehicle tracks comprise individual aircraft tracks, the vehicle track density profile comprises an aircraft track density profile, and wherein the vehicle resources machine learning algorithm comprises an aircraft resources machine learning algorithm.

10. A non-transitory machine-readable medium comprising instructions that when executed by a processor executes a process comprising:
  receiving into a computer processor a first dataset of vehicle trajectories comprising a plurality of individual vehicle tracks forming a first track density;
  receiving into the computer processor a vehicle track density profile;
  receiving into the computer processor a target spatio-temporal coverage metric that is an indication of a user-specified vehicle track density profile;
  receiving into the computer processor a track model comprising a plurality of Heaviside functions encoding track time origins and durations for the plurality of individual vehicle tracks and comprising locations for the plurality of individual vehicle tracks;
  minimizing an approximation of the Heaviside functions as a function of the target spatio-temporal coverage metric;
  optimizing the first dataset of vehicle trajectories as a function of the vehicle track density profile and the minimized approximation of the Heaviside functions;
  reshaping each individual vehicle track start time and start location in the first dataset of vehicle trajectories as a function of the optimizing, thereby generating a second dataset of vehicle trajectories having a second track density; and
  training a vehicle resources machine learning algorithm using the second dataset of vehicle trajectories.

11. The non-transitory machine-readable medium of claim 10, wherein the optimizing comprises a minimization of a deviation from a predetermined value of the target spatio-temporal metric.

12. The non-transitory machine-readable medium of claim 10, wherein the first dataset of vehicle trajectories comprises one or more of a real track dataset and a synthetic track dataset.

13. The non-transitory machine-readable medium of claim 10, wherein the vehicle track density profile comprises one or more of a spatial profile and a temporal profile.

14. The non-transitory machine-readable medium of claim 10, wherein the vehicle track density profile comprises track identifications, track start times, track durations, and track coordinates.

15. The non-transitory machine-readable medium of claim 10, wherein the vehicle track density profile comprises a plurality of Heaviside functions comprising track start times, track durations, and track coordinates.

16. The non-transitory machine-readable medium of claim 10, wherein the vehicle trajectories comprise aircraft trajectories, the individual vehicle tracks comprise individual aircraft tracks, the vehicle track density profile comprises an aircraft track density profile, and wherein the vehicle resources machine learning algorithm comprises an aircraft resources machine learning algorithm.

17. A system comprising:
  a computer processor; and
  a computer memory coupled to the computer processor;
  wherein the computer processor and the computer memory are operable for:
  receiving into the computer processor a first dataset of vehicle trajectories comprising a plurality of individual vehicle tracks forming a first track density;
  receiving into the computer processor a vehicle track density profile;
  receiving into the computer processor a target spatio-temporal coverage metric that is an indication of a user-specified vehicle track density profile:
  receiving into the computer processor a track model comprising a plurality of Heaviside functions encoding track time origins and durations for the plurality of individual vehicle tracks and comprising locations for the plurality of individual vehicle tracks;
  minimizing an approximation of the Heaviside functions as a function of the target spatio-temporal coverage metric;
  optimizing the first dataset of vehicle trajectories as a function of the vehicle track density profile and the minimized approximation of the Heaviside functions;
  reshaping each individual vehicle track start time and start location in the first dataset of vehicle trajectories as a function of the optimizing, thereby generating a second dataset of vehicle trajectories having a second track density; and
  training a vehicle resources machine learning algorithm using the second dataset of vehicle trajectories.

* * * * *

UNITED STATES PATENT AND TRADEMARK OFFICE
CERTIFICATE OF CORRECTION

PATENT NO. : 12,223,847 B2  
APPLICATION NO. : 17/677663  
DATED : February 11, 2025  
INVENTOR(S) : Frewen et al.

Page 1 of 1

It is certified that error appears in the above-identified patent and that said Letters Patent is hereby corrected as shown below:

In the Specification

In Column 3, Line 35, delete "tan h" and insert --tanh-- therefor

In Column 3, Line 56, after "$t_i$", insert --.--

In Column 4, Line 9, delete "as" and insert --at-- therefor

In Column 4, Line 33, delete "as" and insert --at-- therefor

In Column 4, Line 38, delete "as" and insert --at-- therefor

In Column 5, Line 17, delete "717" and insert --715-- therefor

In the Claims

In Column 8, Line 29, in Claim 17, delete "profile:" and insert --profile;-- therefor Signed and Sealed this  
Tenth Day of February, 2026

John A. Squires  
*Director of the United States Patent and Trademark Office*